United States Patent
Hickman Guevara et al.

(10) Patent No.: US 10,344,518 B2
(45) Date of Patent: Jul. 9, 2019

(54) HOOD ENERGY MANAGEMENT APPARATUS FOR HOOD OVERSLAM PROTECTION AND FLUSH FIT

(71) Applicant: FORD GLOBAL TECHNOLOGIES, LLC, Dearborn, MI (US)

(72) Inventors: Alfonso Hickman Guevara, Tlalnepantla (MX); Raul Ezequiel Alvarez Ruiz, Mexico City (MX)

(73) Assignee: Ford Global Technologies LLC, Dearborn, MI (US)

( * ) Notice: Subject to any disclaimer, the term of this patent is extended or adjusted under 35 U.S.C. 154(b) by 80 days.

(21) Appl. No.: 15/427,925

(22) Filed: Feb. 8, 2017

(65) Prior Publication Data
US 2018/0223581 A1 Aug. 9, 2018

(51) Int. Cl.
| | |
|---|---|
| E05F 5/02 | (2006.01) |
| E05F 3/02 | (2006.01) |
| B62D 25/10 | (2006.01) |
| B62D 25/12 | (2006.01) |
| E05F 5/06 | (2006.01) |

(52) U.S. Cl.
CPC ............ *E05F 5/022* (2013.01); *B62D 25/105* (2013.01); *B62D 25/12* (2013.01); *E05F 3/02* (2013.01); *E05F 5/06* (2013.01); *E05Y 2201/21* (2013.01); *E05Y 2201/46* (2013.01); *E05Y 2201/462* (2013.01); *E05Y 2400/202* (2013.01); *E05Y 2900/536* (2013.01)

(58) Field of Classification Search
CPC .............. E05F 5/022; E05F 3/02; E05F 5/025
USPC ................................................ 296/76, 193.11
See application file for complete search history.

(56) References Cited

U.S. PATENT DOCUMENTS

| | | | |
|---|---|---|---|
| 6,039,388 A | 3/2000 | Choi | |
| 8,667,646 B2 | 3/2014 | Krajewski et al. | |
| 9,381,951 B2 | 7/2016 | Iyer et al. | |
| 2013/0048398 A1* | 2/2013 | Krajenke | E05D 5/062 180/89.1 |
| 2013/0048399 A1* | 2/2013 | Krajenke | E05F 5/06 180/89.1 |
| 2013/0219658 A1* | 8/2013 | Krajewski | E05F 5/022 16/82 |
| 2016/0297485 A1* | 10/2016 | Lee | B62D 33/037 |

FOREIGN PATENT DOCUMENTS

| | | |
|---|---|---|
| KR | 100204904 B1 | 6/1999 |
| KR | 200160034 Y1 | 11/1999 |
| KR | 20040093286 A | 11/2004 |

OTHER PUBLICATIONS

English Machine Translation of KR100204904B1.
English Machine Translation of KR20040093286A.
English Machine Translation of KR200160034Y1.

* cited by examiner

*Primary Examiner* — Jason S Morrow
(74) *Attorney, Agent, or Firm* — Jason Rogers; Vichit Chea; King & Schickli PLLC

(57) ABSTRACT

A hood energy management apparatus includes an energy dissipation feature having a magnetic component and a pneumatic component as well as a hood bumper carried on the energy dissipation feature. A related method of managing hood closing energy and also automatically providing proper hood fit and finish is also disclosed.

19 Claims, 7 Drawing Sheets ic chamber through a pneumatic valve as impact force is absorbed.

HOOD ENERGY MANAGEMENT APPARATUS FOR HOOD OVERSLAM PROTECTION AND FLUSH FIT

TECHNICAL FIELD

This document relates generally to the motor vehicle equipment field and, more particularly, to a hood energy management apparatus as well as to a related method of managing hood closing energy whereby overslam protection is provided and a flush fit between the hood and the other components of the motor vehicle including front fender panels is ensured.

BACKGROUND

Traditional hood bumpers incorporate rubber bodies that are adjusted in position and have only a limited ability to absorb hood closing energy or impact forces when the hood is closed. Where hood closing energy and impact forces are not sufficiently dissipated, those forces may detrimentally impact the seal systems, the hood latch mechanism, fit and finish with the front fascia and front fenders and even the hood bumpers. Significantly, over time the rubber of traditional hood bumpers may deform in shape, lose resiliency and become more rigid or otherwise degrade in performance. Unfortunately, such traditional bumpers do not have any means of adjustment to compensate for such a change in performance. This can lead to a loss in overslam protection and flushness of hood fit.

This document relates to a new and improved "smart" hood energy management apparatus having an energy dissipation feature including a magnetic component and a pneumatic component. Advantageously, the hood energy management apparatus provides improved hood closing energy and impact force dissipation, improved flushness, fit and finish, and enhanced adjustability so as to provide optimum performance over an extended service life. Toward this end, the hood energy management apparatus includes a controller which utilizes and responds to data input to provide automatic adjustment and optimal operating characteristics at all times.

SUMMARY

In accordance with the purposes and benefits described herein, a hood energy management apparatus is provided. That hood energy management apparatus comprises an energy dissipation feature including a magnetic component and a pneumatic component as well as a hood bumper carried on the energy dissipation feature. Further, the hood energy management apparatus includes a controller configured to control the magnetic component to absorb hood closing energy during hood closing and also provide a flush fit between the hood and other components of the motor vehicle including, for example, the front fenders and the front fascia when the hood is closed.

The energy dissipation feature may include a housing. The magnetic component may include a first magnet and a second magnet held in the housing. The pneumatic component may include a pneumatic chamber in the housing between the first magnet and the second magnet as well as a pneumatic valve in communication with the pneumatic chamber. For purposes of this document, the term "magnet" includes any type of magnet or magnetic element including, for example, an electromagnet.

In some embodiments, the second magnet is an electromagnet and the controller is configured to control a magnetic field generated by that electromagnet. Further, in some embodiments the hood energy management apparatus includes a hood bumper connected to the first magnet by a telescopic arm that allows one to adjust the initial position of the hood bumper with respect to the hood so as to provide for proper operation of the hood energy management apparatus.

In accordance with an additional aspect, the hood energy management apparatus comprises a housing, a first magnet carried in the housing, a second magnet carried in the housing, a pneumatic chamber in the housing, a pneumatic valve in communication with that pneumatic chamber and a hood bumper connected to the first magnet. In at least one of many possible embodiments, the second magnet is an electromagnet. Further, the hood energy management apparatus may include a controller configured to control a magnetic field generated by the second magnet/electromagnet whereby impact energy is absorbed during hood closing and a flush fit of the hood with, for example, the front fender and front fascia of the motor vehicle is provided once the hood is closed and seated.

The first magnet may be displaceable within the housing while the second magnet may be fixed to the housing. In addition, the hood energy management apparatus may include a telescoping arm connecting the hood bumper to the first magnet as well as a mounting post for securing the hood energy management apparatus to a support surface of the motor vehicle. Both the telescoping arm and the mounting post may be made adjustable to allow the hood energy management apparatus to be properly positioned and oriented with respect to the hood in order to provide the best possible performance.

The hood energy management apparatus may further include at least one sensor selected from a group consisting of a flushness sensor, an optical sensor, an acoustic sensor, an accelerometer, a proximity sensor, a position sensor and combinations thereof. In some of the many possible embodiments the at least one sensor is connected to the hood. In other embodiments, the at least one sensor is connected to another component of the motor vehicle.

The first magnet and the second magnet of the hood energy management apparatus are oriented with like magnetic poles facing together in order to produce a force that repels the first magnet from the second magnet during hood closing with the necessary force to dissipate hood closing energy and impact force. That repelling force may be subsequently reduced and automatically adjusted by the controller to then insure proper fit and finish of the hood to other components of the motor vehicle once the hood is closed.

In accordance with still another aspect, a method is provided of managing hood closing energy. That method comprises the steps of dissipating a first portion of the hood closing energy by magnetic energy absorption and dissipating a second portion of the hood closing energy by pneumatic energy absorption.

The method may further include the step of providing a hood energy apparatus with an energy dissipation feature including a magnetic component and a pneumatic component. Further, the method may include the step of repelling a first magnet connected to a hood bumper with a second magnet so as to provide for the magnetic energy absorption. In addition, the method may include the step of providing a pneumatic chamber between the first magnet and the second magnet as well as the step of expelling air from the pneumatic chamber through a pneumatic valve so as to provide air damping and pneumatic energy absorption of the hood closing energy.

In addition, the method may include using an electromagnet for the second magnet and configuring the controller to control the electromagnet to absorb hood closing energy during hood closing and also provide the hood with a flush fit with other components of the motor vehicle once the hood is closed.

In the following description, there are shown and described several preferred embodiments of the hood energy management apparatus as well as the related method of managing hood closing energy. As it should be realized, the hood energy management apparatus and related method are capable of other, different embodiments and their several details are capable of modification in various, obvious aspects all without departing from the hood energy management apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood energy management apparatus as well as the related method and together with the description serve to explain certain principles thereof.

Reference will now be made in detail to the present preferred embodiments of the hood energy management apparatus, examples of which are illustrated in the accompanying drawing figures.

DETAILED DESCRIPTION

Figure 1:
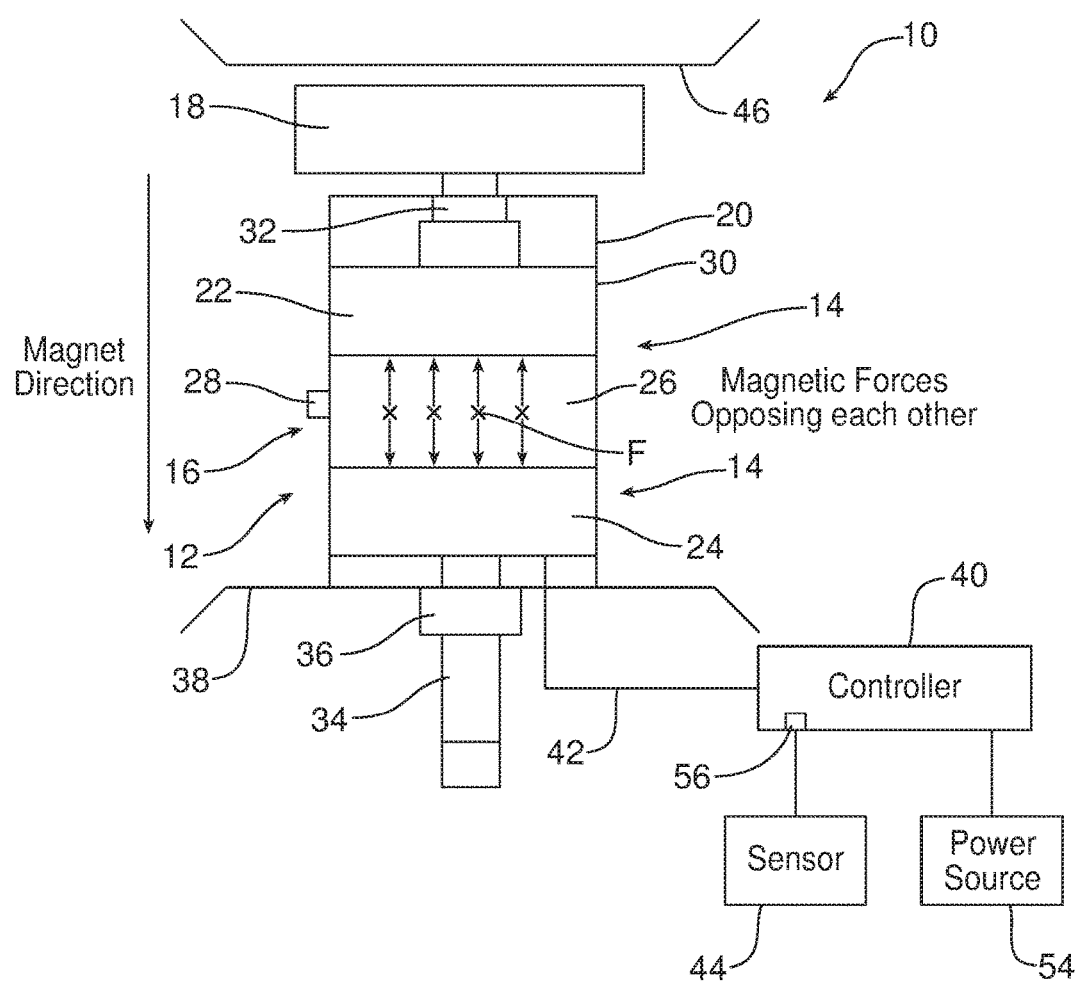
FIG. 1 is a schematic block diagram of the hood energy management apparatus.

Reference is now made to FIG. 1 which schematically illustrates the hood energy management apparatus 10. That hood energy management apparatus 10 includes an energy dissipation feature, generally designated by reference numeral 12, including a magnetic component 14 and a pneumatic component 16. The hood energy management apparatus 10 also includes a hood bumper 18 carried on the energy dissipation feature 12.

More specifically, the energy dissipation feature 12 includes a housing 20. The magnetic component 14 of the energy dissipation feature 12 includes a first magnet 22 and a second magnet 24 that are held in the housing 20. The pneumatic component 16 of the energy dissipation feature 12 includes a pneumatic chamber 26 in the housing 20 between the first magnet 22 and the second magnet 24 and a pneumatic valve 28 carried on the housing 20 and in communication with the pneumatic chamber. The pneumatic valve 28 may be selected to provide performance specifications to meet desired operating parameters for any particular application of the hood energy management apparatus 10.

In the illustrated embodiment, the first magnet 22 is displaceable within the housing 20. The first magnet 22 may include an outer edge 30 juxtaposed to the housing 20 with a coating of low friction material such as polytetrafluoroethylene in order to allow for smooth sliding action of the first magnet within the housing. The second magnet 24 may be an electromagnet that is fixed to the housing 20.

In the illustrated embodiment, the hood bumper 18 is connected to the first magnet 22 by means of an adjustable telescopic arm 32. An adjustable mounting post 34 and cooperating bolt 36 is secured to the second magnet 24 or the housing 20 of the energy dissipation feature 12. More specifically, the mounting post 34 and cooperating bolt 36 allow one to mount the hood energy management apparatus 10 at a desired location on a support surface 38 of the motor vehicle. The adjustable telescopic arm 32 and adjustable mounting post 34 then allow one to further properly orient and position the hood energy management apparatus 10 on that support surface 38 at initial installation so that the apparatus may function as intended to both (a) dissipate hood closing energy and impact force when closing the hood and (b) properly maintain a flush fit between the hood and other body components of the motor vehicle including, for example, the fender panels and the front fascia, following closing.

The hood energy management apparatus 10 also includes a controller 40 that is configured to control the magnetic component 14 to absorb hood closing energy during hood closing and also provide a flush fit once the hood 46 is closed. More specifically, the controller 40 may take the form of a computing device such as a dedicated microprocessor or electronic control unit (ECU) operating in accordance with instructions from appropriate control software. Thus, the controller 40 may include one or more processors, one or more memories, and one or more network interfaces all communicating with each other over a communication bus. In the illustrated embodiment, the controller 40 is connected to the electromagnet/second magnet 24 by a lead 42 and the controller is configured to control the magnetic field generated by the electromagnet/second magnet.

As further illustrated in FIG. 1, the controller 40 is connected to one or more sensors 44, that monitor the position of the motor vehicle hood 46 (see also FIG. 2) as well as the flushness of the hood with respect to other adjacent body components of the motor vehicle such as the fender 48 and front fascia 50 when the hood is closed. The sensors may include any appropriate sensor useful for this intended purpose including flushness sensors, optical sensors and acoustic sensors, accelerometers, position sensors, proximity sensors and combinations thereof. Those sensors 44 may be mounted on the hood 46, to one or more of the hood hinges or even to other components of the motor vehicle adjacent to the hood when the hood is closed. The sensors 44 may measure various parameters including but not necessarily limited to hood opening angle, hood acceleration when being closed, hood position and the like.

Figure 2:
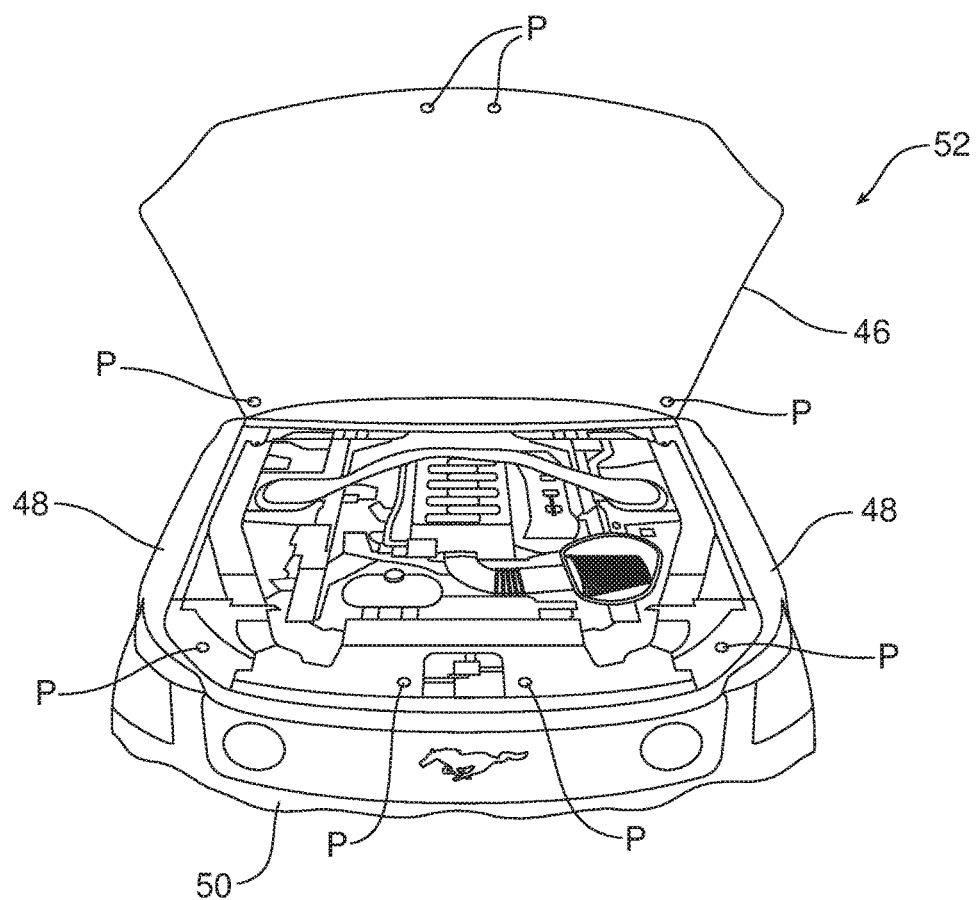
FIG. 2 is a perspective view illustrating a motor vehicle equipped with the hood energy apparatus of FIG. 1 and showing one possible arrangement for the positioning of the various components of the hood energy management apparatus on a motor vehicle.

FIG. 2 illustrates potential mounting positions P for the hood energy management apparatus 10, including one or more energy dissipation features 12 and one or more sensors 44 within the engine compartment of the motor vehicle 52. Here it should be appreciated that the illustrated positions P are merely exemplary and not limiting in scope.

As further illustrated in FIG. 1, the controller 40 is also connected to a power source 54 such as a battery carried on the motor vehicle 52. As will be described in greater detail below, the controller 40 responds to data received from the sensors 44 at the data input 56 and then controls distribution of current from the power source 54 to the electromagnet/second magnet 24 through the lead 42 in a manner that dissipates closing energy and impact force when the hood is closed and also insures a flush fit between the hood and the fender panels 48 and front fascia 50 of the motor vehicle 52 following hood closure.

Figure 3A:
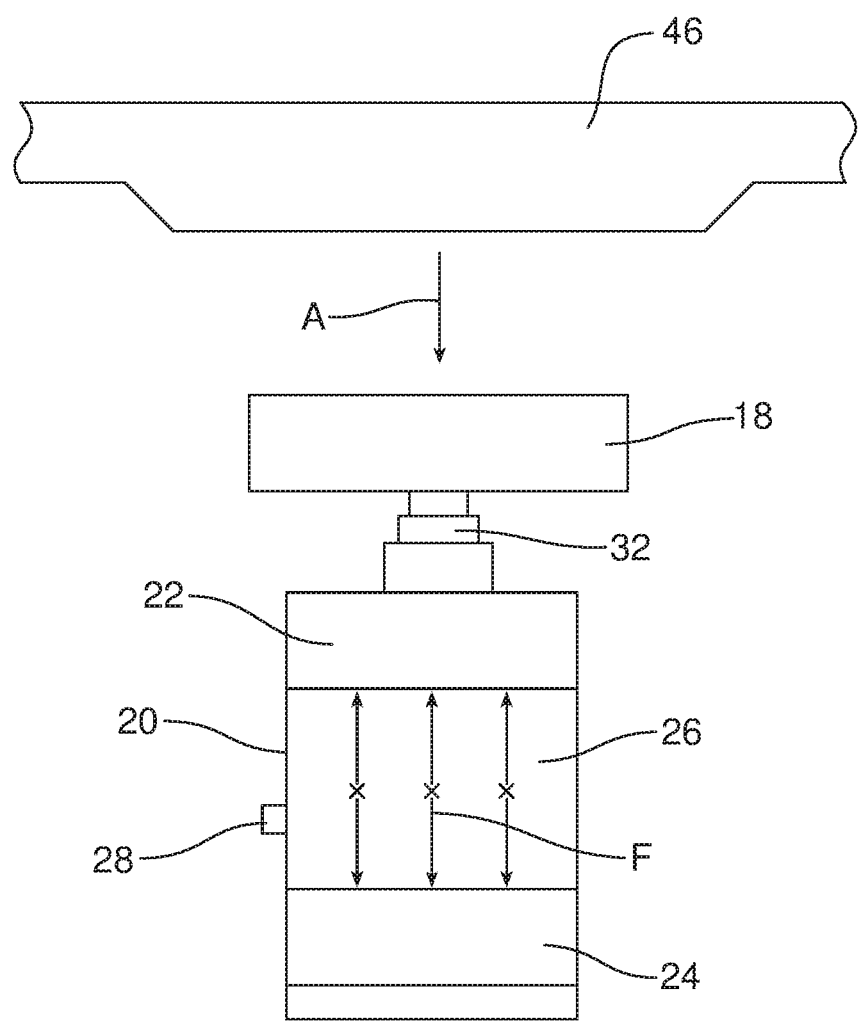
FIGS. 3a-3c are schematic illustrations of the hood energy management apparatus illustrating, respectively, operation during times when (3a) the hood is open, (3b) at hood impact and (3c) following impact when the hood position is adjusted for flushness of fit with other body components of the motor vehicle including, for example, the front fender panels and the front fascia.
Figure 3B:
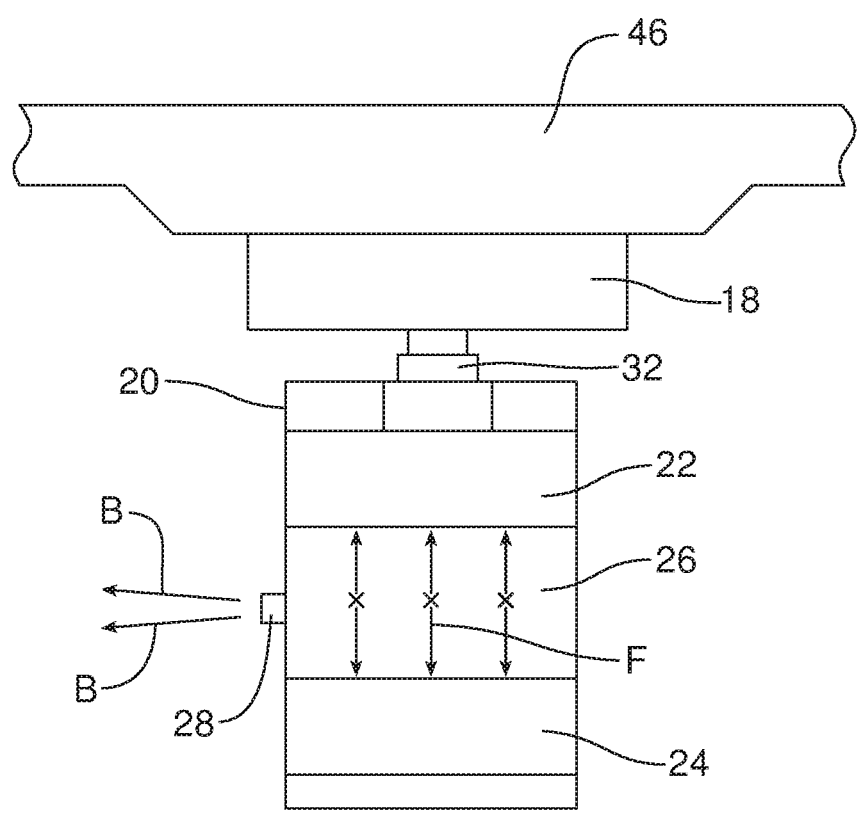
Figure 3C:
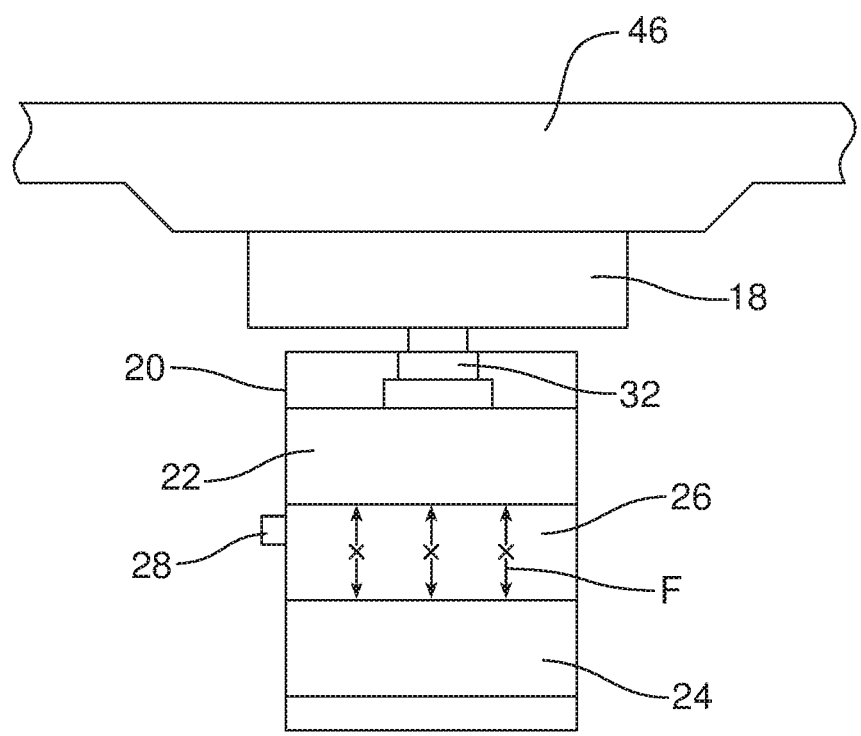
Figure 4:
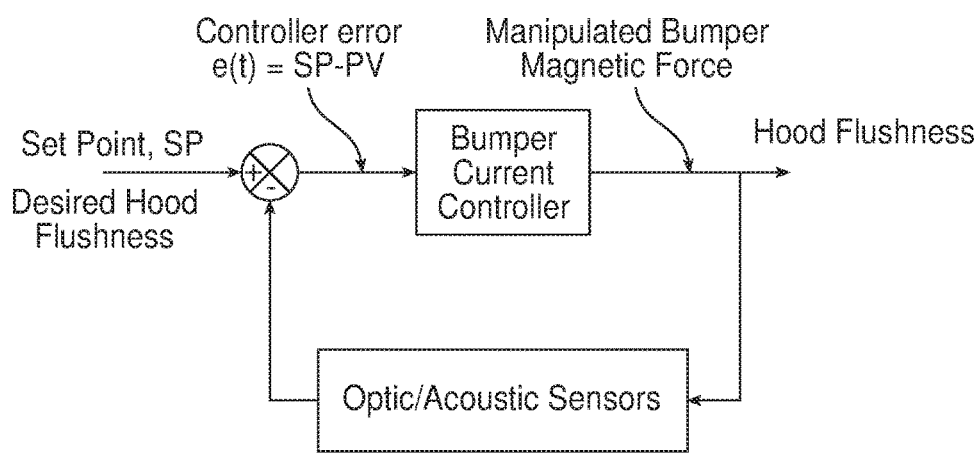
FIG. 4 is a schematic illustration demonstrating the control logic for the hood energy management apparatus.
Figure 5:
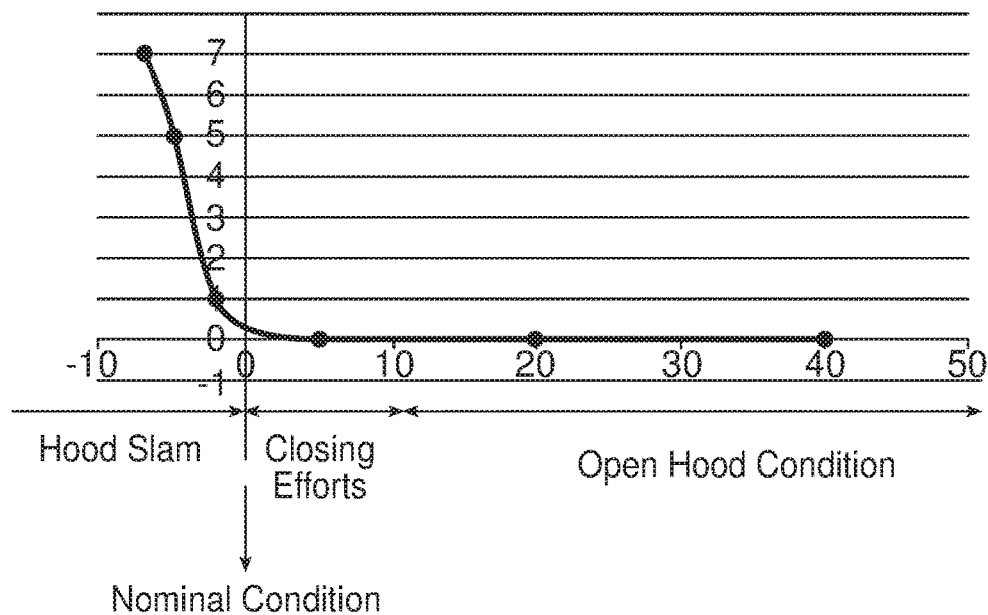
FIG. 5 is a graph illustrating electromagnet bumper current (a) versus hood flushness measurement (mm) for one possible embodiment of the hood energy management apparatus.

FIG. 4 schematically illustrates one possible control logic for obtaining this desired function. FIG. 5 is a graph of the relationship of the control current delivered by the controller 40 from the power source 54 to the electromagnet/second magnet 24 in response to data from the sensors 44. As illustrated, the current is highest when the hood is opened and being closed (note action arrow A in FIG. 3a), thereby providing a strong magnetic force repulsing the displaceable first magnet 22 from the electromagnet/second magnet 24 to thereby provide for magnetic energy absorption. This magnetic energy absorption works in conjunction with the pneumatic energy absorption created by the expulsion of air (note action arrows B in FIG. 3b) when the hood 46 makes contact with the hood bumper 18 forcing the first magnet 22 downward into the housing 20, decreasing the volume of the pneumatic chamber 26 and forcing that air through the pneumatic valve 28. As the hood closing energy and impact force are dissipated, the sensors 44 continue to monitor the position of the hood 46 with respect to the fender panels 48 and the front fascia 50. In response to this data, the controller 40 lowers the current provided from the power source 54 to the electromagnet/second magnet 24 to a level that ensures the best flush fit (see FIG. 3c). Advantageously, the "smart" hood energy management apparatus 10 automatically compensates for ambient temperature variations, any deformation in the shape or performance of the resilient hood bumper 18 and performance of the pneumatic valve 28 over time as well as other degradation occurring as a result of environmental or other conditions so as to maintain proper fit and finish over a long service life.

Consistent with the above description, the hood energy management apparatus 10 is also characterized by a method of managing hood closing energy. That method includes dissipating a first portion of the hood closing energy by magnetic energy absorption through operation of the magnetic component 14 and the controller 40 in response to data from the sensors 44, and the dissipating of a second portion of the hood closing energy by pneumatic energy absorption through the expulsion of air from the pneumatic chamber 26 through the pneumatic valve 28.

Further, the method includes providing a hood energy management apparatus 10 with an energy dissipation feature 12 including the magnetic component 14 and the pneumatic component 16.

As noted previously, the method includes repelling the first magnet 22 connected to the hood bumper 18 with a magnetic field F generated by directing current from the power source 54 through the electromagnet/second magnet 24.

The method also includes providing the pneumatic chamber between the first magnet 22 and the second magnet 24 as well as the cooperating valve 28 for expelling air from the pneumatic chamber in order to provide air damping of the hood closing energy. In addition, the method includes configuring the controller 40 to control the electromagnet/second magnet 24 to absorb the hood closing energy during hood closing by passage of a relatively high current to the electromagnet/second magnet and also provide the hood 46 with a flush fit by passing a relatively low current from the power source to the electromagnet/second magnet 24 once the hood is closed.

In summary, the hood energy management apparatus and related method disclosed herein provide a number of benefits and advantages. The hood energy management apparatus includes a controller 40 that provides intelligent operation which protects motor vehicle components from damage due to hood slamming energy and impact force while also allowing auto adjustment to an optimal fit and finish condition between the hood 46 and other components of the motor vehicle such as the fender panels 48 and front fascia 50 following hood closing. This is done by operation of the controller 40 based upon data received from the sensors 44 mounted in the engine compartment of the motor vehicle 52 that are invisible to the operator. Advantageously, this auto adjustment also reduces waiting time in the assembly line required in the past to adjust and fine tune state of the art hood bumpers for proper fit and finish.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hood energy management apparatus, comprising:
    an energy dissipation feature including a housing holding a magnetic component and a pneumatic component; and
    a hood bumper carried on said energy dissipation feature.

2. The hood energy management apparatus of claim 1, further including a controller configured to control said magnetic component to absorb hood closing energy during hood closing.

3. The hood energy management apparatus of claim 2, wherein said magnetic component includes a first magnet and a second magnet held in said housing and said pneumatic component includes a pneumatic chamber in said housing between said first magnet and said second magnet and a pneumatic valve in communication with said pneumatic chamber.

4. The hood energy management apparatus of claim 3, wherein said hood bumper is connected to said first magnet by a telescopic arm.

5. The hood energy management apparatus of claim 4, wherein said second magnet is an electromagnet and said controller is configured to control a magnetic field generated by said electromagnet.

6. A hood energy management apparatus, comprising:
    a housing;
    a first magnet carried in said housing;
    a second magnet carried in said housing;
    a pneumatic chamber in said housing;
    a pneumatic valve in communication with said pneumatic chamber; and
    a hood bumper connected to said first magnet.

7. The hood energy management apparatus of claim 6, wherein said second magnet is an electromagnet.

8. The hood energy management apparatus of claim 7, further including a controller configured to control a magnetic field generated by said second magnet whereby impact energy is absorbed during hood closing.

9. The hood energy management apparatus of claim 8, wherein said first magnet is displaceable within said housing and said second magnet is fixed to said housing.

10. The hood energy management apparatus of claim 9, further including a telescoping arm connecting said hood bumper to said first magnet.

11. The hood energy management apparatus of claim 10, further including a mounting post for securing said hood energy management apparatus to a motor vehicle.

12. The hood energy management apparatus of claim 11, further including at least one sensor selected from a group consisting of a flushness sensor, an optical sensor, an acoustic sensor, an accelerometer, a proximity sensor, a position sensor and combinations thereof.

13. The hood energy management apparatus of claim 12, wherein said at least one sensor is connected to said hood.

14. The hood energy management apparatus of claim 13, wherein said first magnet and said second magnet are oriented with like magnetic poles facing together so that said first magnet is repelled from said second magnet during hood closing.

15. A method of managing hood closing energy, comprising:
dissipating, by a magnetic component, a first portion of said hood closing energy by magnetic energy absorption; and
dissipating, by a pneumatic component, a second portion of said hood closing energy by pneumatic energy absorption wherein said magnetic component and said pneumatic component are held in a housing.

16. The method of claim 15, further including repelling a first magnet connected to a hood bumper with a second magnet.

17. The method of claim 16, further including providing a pneumatic chamber between said first magnet and said second magnet.

18. The method of claim 17, further including expelling air from said pneumatic chamber through a pneumatic valve so as to provide air damping of said hood closing energy.

19. The method of claim 18, further including using an electromagnet for said second magnet and configuring a controller to control said electromagnet to absorb hood closing energy during hood closing.

* * * * *